I. M. WOODMANSEE.
LUBRICATING DEVICE.
APPLICATION FILED NOV. 14, 1913.
1,116,662.
Patented Nov. 10, 1914.
2 SHEETS—SHEET 2.
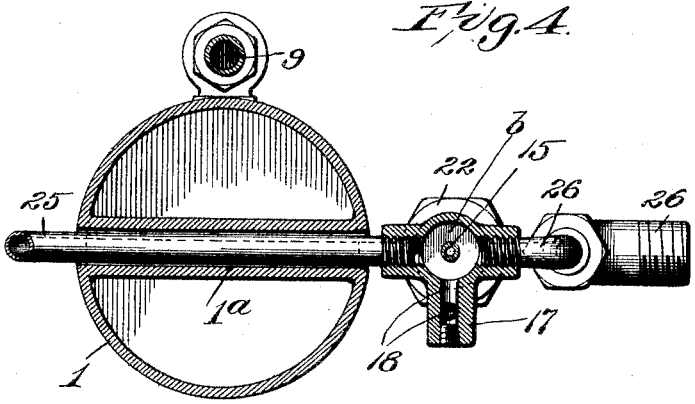
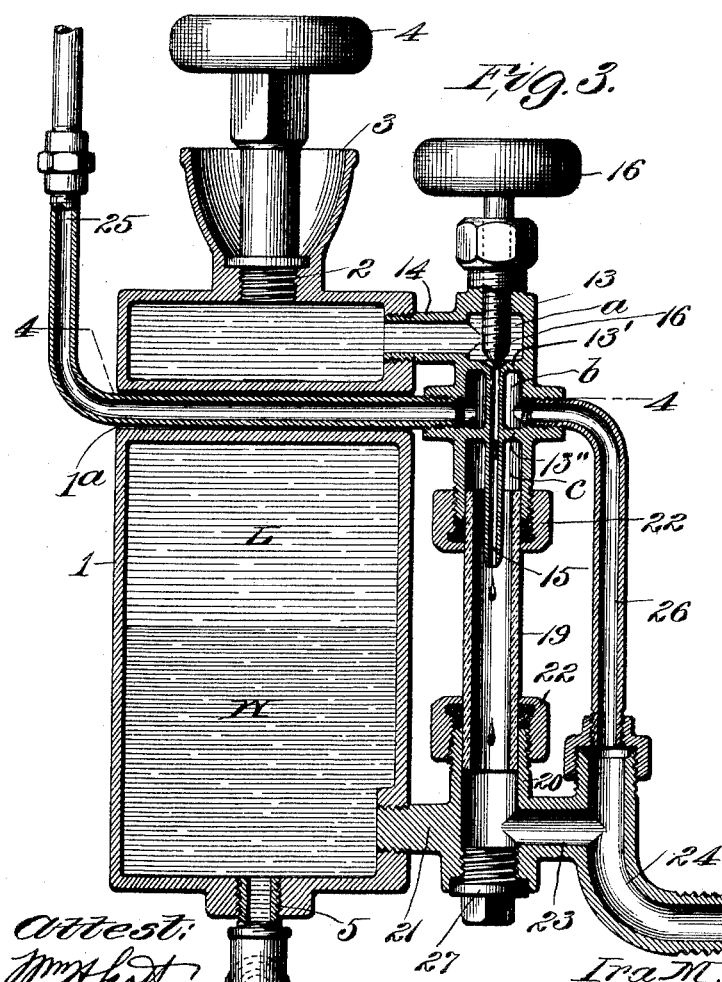

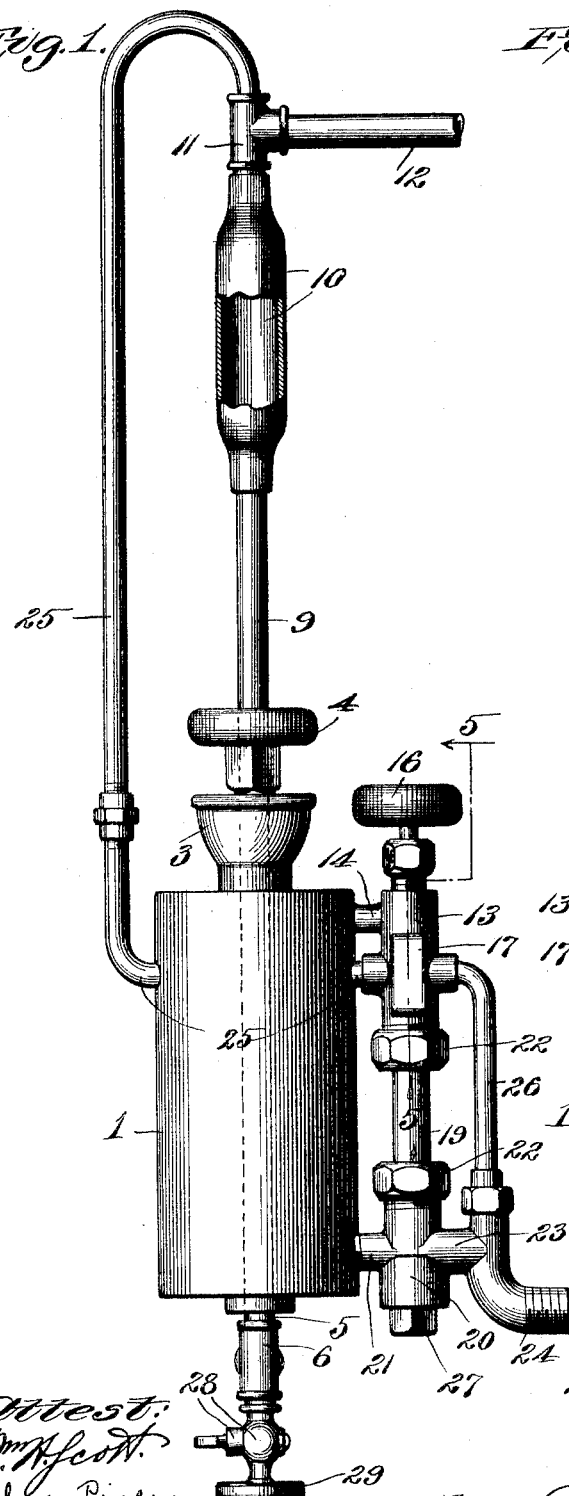
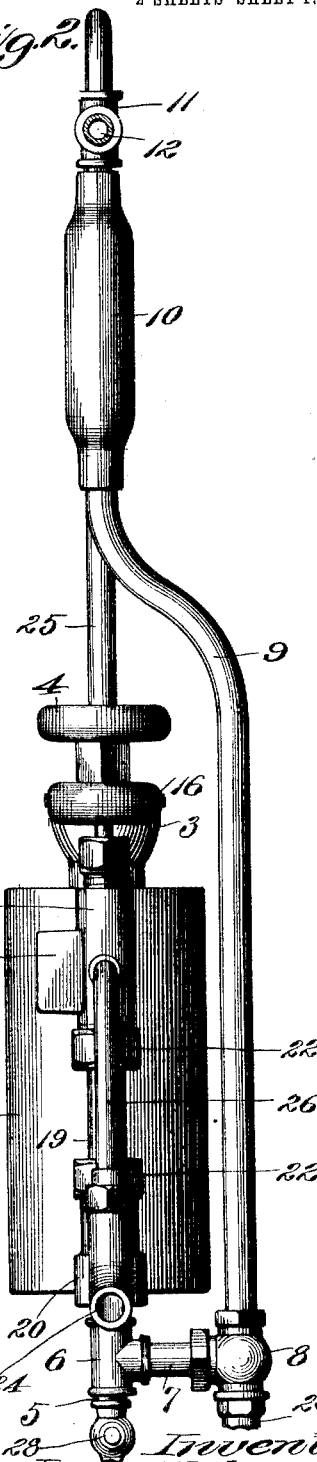

UNITED STATES PATENT OFFICE.

IRA M. WOODMANSEE, OF ST. LOUIS, MISSOURI, ASSIGNOR TO ALBERT R. CHAPPELL, OF ST. LOUIS, MISSOURI.

LUBRICATING DEVICE.

1,116,662. Specification of Letters Patent. Patented Nov. 10, 1914.

Application filed November 14, 1913. Serial No. 800,974.

*To all whom it may concern:*

Be it known that I, IRA M. WOODMANSEE, a citizen of the United States, residing at the city of St. Louis, State of Missouri, have invented certain new and useful Improvements in Lubricating Devices, of which the following is a specification, reference being had to the accompanying drawings, forming a part hereof, in which—

Figure 1 is a side elevational view of a lubricating device embodying my invention; Fig. 2 is a front elevational view of the same; Fig. 3 is an enlarged vertical sectional view through the same; Fig. 4 is a detail sectional view on the line 4—4, Fig. 3; and Fig. 5 is an enlarged detail sectional view on the line 5—5, Fig. 1.

This invention relates to certain new and useful improvements in lubricating devices especially adapted and designed for use in connection with steam-engine valves, pistons, and cylinders, the objects of my invention being to provide a device of the kind stated wherein the supply of lubricant for the engine parts to be lubricated may be readily regulated or controlled and the supplied lubricant preferably heated to an approximately high degree of temperature substantially uninterruptedly carried and conducted by and with the steam supply to the engine parts to be lubricated, and to improve generally upon devices of the kind described.

With the above and other objects in view, my present invention resides in certain novel features of construction, arrangement, and combination of parts, all as will hereinafter be described and afterward pointed out in the claims.

Referring to the accompanying drawings, in which like reference characters refer to like parts throughout the several views, 1 indicates a preferably cylindrical reservoir or tank for the lubricant, tank 1 being provided preferably at its upper end with a lubricant-supply opening 2 having preferably a bell or funnel-shaped mouth 3 and adapted to be closed by a threaded plug or the like 4. Threaded into the lower end, and communicating with the interior, of tank 1 is a short section of pipe 5 communicating through a T-coupling or the like 6, a cross pipe 7, and an angle valve or the like 8 with a water of condensation supply pipe 9 leading from and communicating with a suitable condenser 10, which, in turn, communicates with one member of a suitable T-coupling or the like 11 threaded on a pipe 12 leading from the boiler or other source of steam supply, not shown.

13 indicates a substantially tubular member which is lengthwise interiorly divided by transverse or cross walls 13' and 13'' into a lubricant-receiving-chamber *a*, a first or upper steam-receiving chamber *b* having steam inlet and outlet openings, and a second or lower steam and lubricant-receiving-chamber *c*, member 13 being also provided with a lateral tubular extension 14 communicating with chamber *a* and which is adapted to be threaded into tank 1 adjacent the upper end thereof and thereby afford a lubricant discharge-outlet or passage from tank 1 into chamber *a*. Leading at one, or its upper, end from chamber *a*, and extending lengthwise of, and centrally within, member 13, through its said chamber *b* and cross-walls 13' and 13'', is an elongated lubricant discharge-nozzle 15 preferably having comparatively thin walls and a bore of small diameter and discharging and terminating at its other or lower end preferably somewhat below the lower end of said member 13, the supply of lubricant to and through said nozzle 15 being regulated or controlled by a needle valve or the like 16 suitably mounted on member 13, as clearly seen in Figs. 3 and 5. Member 13 is further provided with a lateral boss or the like 17 provided interiorly with a by-pass 18 whereby, as seen clearly in Fig. 5, communication is had between said steam chambers *b* and *c* of member 13.

Fitting interiorly at its upper end in, and communicating with, and forming substantially a part or continuation of, steam chamber *c* of member 13, is a preferably glass or other transparent tubular member 19 having its lower end interiorly fitting in, communicating with, and supported by, a tubular member 20 in turn forming substantially a part or continuation of chamber *c* and supported in position by means preferably of an integral lateral boss 21 threaded into tank 1, as shown in Fig. 3. As also shown in Fig. 3, tube 19 is preferably removably held in communicating position between members 13 and 20 by means of suitable packing nuts, stuffing boxes, or the like 22. Member 20 is also provided with a lateral tubular extension 23 leading into, and communicating with, a tubular elbow or the like 24 which, in turn, is adapted to lead into or communicate with the valve casing and piston-cylinder of the engine to be lubricated.

Communicating at one end with coupling 11, as seen in Fig. 1, and leading therefrom downwardly and preferably laterally through a passage 1ª provided for the purpose in tank 1, as seen clearly in Fig. 3, is a steam-supply pipe 25, pipe 25 discharging at its other end directly into the steam-inlet of chamber $b$ of member 13; and leading at one end from the main steam-outlet of chamber $b$ is a short section of tubing 26 forming substantially a continuation of steam-supply pipe 25 and leading at its other end into the upper end of said elbow 24, as shown in Fig. 3.

In operation or use, tank 1 is first supplied with a suitable lubricant L through its said opening 2. On the steam from the boiler or other source of supply being permitted to flow through pipe 12, a portion of such steam will flow through pipe 25 into chamber $b$ of member 13, where it divides and flows partly through pipe 26 and elbow 24 into the valve casing or to the parts of the engine to be lubricated and partly through by-pass 18 into chamber $c$ and its continuations 19 and 20 and from thence through lateral extension 23 and elbow 24 also into the valve casing or to the parts of the engine to be lubricated. The other portion of the steam from pipe 12, on flowing into condenser 10, is there condensed, the water of condensation W thence flowing through supply-pipes 9 and pipe 5 and their communicating connections, valve 8 being open, into tank 1, where it gradually forces or drives the lubricant L in tank 1 through said discharge outlet or passage 14 into chamber $a$ of member 13, lubricant L thence flowing through the regulated bore of nozzle 15 into steam-chamber $c$ and its extensions or continuations 19 and 20, where it, in turn, is carried or conducted by the steam entering through said by-pass 18 into chamber $c$ and its extensions 19 and 20 directly through said lateral extension 23 and elbow 24 into the valve casing or to the parts of the engine to be lubricated. By providing the communicating steam chambers $b$ and $c$ and by so dividing the steam supply as I have described, it will be seen that I not only provide a suitable supply of steam to carry or conduct the supplied lubricant to the engine parts to be lubricated, but also thereby balance any back flow or pressure of steam there might be from pipe 26 and elbow 24 which might tend to retard or interrupt the proper flow of the lubricant from nozzle 15, the amount of lubricant flowing from nozzle 15 and so carried or conducted to the parts of the engine to be lubricated being regulated by valve 16 and clearly observed through transparent chamber-extension 19. By passing steam-supply pipe 25 laterally through passage 1ª in lubricant-tank 1, as shown, the lubricant in tank 1 is somewhat heated so that it will flow freely into chamber $a$. The lubricant on flowing through nozzle 15 is again or further heated by the steam in chamber $b$ to substantially or approximately steam heat, so that, on entering chamber $c$, it freely passes or is conducted, as described, with the steam in chamber $c$ to the engine parts to be lubricated, the steam in chamber $c$ being but slightly, if at all, reduced in temperature or condensed thereby.

At its lower end member 20 is preferably closed by a removable plug or the like 27, whereby not only may a broken or damaged tube 19 be readily removed and replaced by a new tube 19, but also, when necessary, surplus lubricant may be removed or drained from chamber $c$; and similarly T-coupling or member 6 is preferably provided with a pet-cock 28, whereby the water and remaining lubricant in tank 1 may be removed or drained therefrom, valve 8 having a wheel or manipulating member 29 for regulating the flow of water from condenser 10 and pipe 9 into pipe 5 and tank 1.

I am aware that minor changes in the several parts of my new lubricating device may be made and substituted for those herein shown and described without departing from the nature and spirit of my invention.

Having thus described my invention, what I claim and desire to secure by Letters Patent is:

1. In a lubricating device of the kind described, a lubricant-tank having a discharge-outlet, a lubricant-receiving-chamber in communication with said outlet, a steam-chamber having an inlet-opening and a plurality of outlet-openings, said inlet opening being adapted to communicate with a source of steam supply and one of said outlet-openings being adapted to communicate with the engine parts to be lubricated, a second steam-chamber in communication with the other steam-outlet-opening of said first steam-chamber and adapted also to communicate with the engine parts to be lubricated, and a lubricant-discharge nozzle leading from said lubricant-receiving-chamber into said second steam-chamber; substantially as described.

2. In a lubricating device of the kind described, a lubricant-tank having a discharge-outlet, a lubricant-receiving-chamber in communication with said outlet, a steam-chamber having an inlet-opening and a plurality of outlet-openings, said inlet opening being adapted to communicate with a source of steam supply and one of said outlet-openings being adapted to communicate with the engine parts to be lubricated, a second steam-chamber in communication with the other outlet-opening of said first steam-chamber and adapted also to communicate with the engine parts to be lubricated, and a lubricant-discharge nozzle extending lengthwise through said first steam-chamber and leading from said lubricant-receiving-chamber directly into said second steam-chamber; substantially as described.

3. In a lubricating device of the kind described, a lubricant-tank having a discharge-outlet, a lubricant-receiving-chamber in communication with said outlet, a steam-chamber having an inlet-opening and a plurality of outlet-openings, said inlet-opening being adapted to communicate with a source of steam supply, a steam-pipe adapted to lead from one of said outlet-openings of said steam-chamber to the engine parts to be lubricated, a second steam-chamber in communication with the other outlet-opening of said first steam-chamber and with said steam-pipe, a lubricant-discharge-nozzle extending lengthwise through said first steam-chamber and leading from said lubricant-receiving-chamber directly into said second steam-chamber, and means for regulating the flow of lubricant through said nozzle; substantially as described.

4. In a lubricating device of the kind described, a lubricant-tank having a discharge-outlet, a lubricant-receiving-chamber in communication with said outlet, means for gradually driving the lubricant from said tank through said outlet into said lubricant-receiving-chamber, a steam-chamber having a steam-inlet opening and a plurality of steam-outlet openings, a steam-supply pipe adapted to lead from a source of steam supply directly into said steam-chamber through its said inlet-opening, a steam-pipe adapted to lead from one of said outlet-openings of said steam-chamber to the engine parts to be lubricated, a second steam-chamber in communication with the other outlet-opening of said first steam-chamber and with said steam-pipe, a lubricant-discharge nozzle extending lengthwise through said first steam-chamber and leading from said lubricant-receiving-chamber directly into said second steam-chamber, and means for regulating the flow of lubricant through said nozzle; substantially as described.

5. In a lubricating device of the kind described, a substantially tubular member lengthwise comprising a lubricant-receiving-chamber, an upper steam-chamber, and a lower steam-chamber communicating with said upper steam-chamber, and a lubricant-discharge nozzle extending lengthwise through said upper steam-chamber and leading from said lubricant-receiving chamber directly into said lower steam-chamber;
substantially as described.

6. In a lubricating device of the kind described, a substantially tubular member lengthwise comprising a lubricant-receiving chamber, an upper steam chamber having a steam inlet-opening and a plurality of steam outlet-openings, and a lower steam-chamber having an outlet opening and communicating with one of the outlet openings of said upper steam-chamber, a lubricant-discharge nozzle extending lengthwise through said upper steam-chamber and leading from said lubricant-receiving chamber directly into said lower steam-chamber, and means for regulating the flow of lubricant through said nozzle; substantially as described.

7. In a lubricating device, a lubricant-receiving chamber, a steam-chamber having inlet and outlet openings, a second steam-chamber having a steam inlet-opening, said second steam-chamber being adapted to communicate with the engine parts to be lubricated, and a lubricant-discharge-nozzle projecting through said first steam-chamber and leading from said lubricant-receiving-chamber into said second steam-chamber, substantially as described.

8. In a lubricating device of the kind described, a lubricant-tank, said tank having a walled passage extending therethrough, a lubricant-receiving chamber in communication with said tank, a steam-chamber adapted to communicate with the engine parts to be lubricated, a steam-supply pipe projecting through said passage and leading into said steam-chamber, a second steam-chamber adapted also to communicate with the engine parts to be lubricated, said second steam-chamber having communication with said first steam-chamber, and a lubricant-discharge nozzle projecting through said first steam-chamber and leading from said lubricant-receiving-chamber into said second steam-chamber; substantially as described.

In testimony whereof, I have signed my name to this specification, in the presence of two subscribing witnesses.

IRA M. WOODMANSEE.

Witnesses:
RUTH PETERSON,
ZELMA PINCUS.

---

Copies of this patent may be obtained for five cents each, by addressing the "Commissioner of Patents, Washington, D. C."